United States Patent [19]
Lodge

[11] 3,777,549
[45] Dec. 11, 1973

[54] MEASUREMENT OF HOLE PRESSURE DIFFERENTIALS AND PROTUBERANCE PRESSURE DIFFERENTIALS IN NON-NEWTONIAN LIQUIDS OR THE LIKE

[75] Inventor: Arthur Scott Lodge, Madison, Wis.

[73] Assignee: Wisconsin Alumni Research Foundation, Madison, Wis.

[22] Filed: July 29, 1971

[21] Appl. No.: 167,254

[52] U.S. Cl. .................................. 73/53, 73/213
[51] Int. Cl. ............................................ G01n 11/00
[58] Field of Search .................. 73/53, 61.1 R, 402, 73/205 D, 205 R, 205 L, 213, 438

[56] References Cited
UNITED STATES PATENTS
2,439,723  4/1948  Engdahl .......................... 73/213 X FOREIGN PATENTS OR APPLICATIONS
432,416  7/1935  Great Britain ...................... 73/213

Primary Examiner—S. Clement Swisher
Assistant Examiner—Joseph W. Roskos
Attorney—Burmeister, Palmatier & Hamby

[57] ABSTRACT

The hole pressure differential is measured by providing at least one hole in a wall along which the liquid is caused to flow. The wall may constitute a portion of a passage, reaction vessel or the like. A pressure transducer or sensor is recessed into the hole to measure the hole pressure therein. At least one non-hole pressure transducer is also provided to measure the non-hole pressure along the wall. The hole pressure and the non-hole pressure, as measured, are combined subtractively, or otherwise, so as to derive the difference between the non-hole pressure and the hole pressure at a particular location along the wall. The non-hole pressure sensor may be located opposite the hole at a point where the non-hole pressure is the same as it would be at the location of the hole. In another arrangement, two non-hole pressure sensors are provided upstream and downstream at intervals from the hole, in which case the hole pressure may be combined subtractively with the average of the non-hole pressures. Similarly, two holes and hole pressure sensors may be spaced upstream and downstream at intervals from the non-hole pressure sensor so that the non-hole pressure may be combined subtractively with the average of the hole pressures. Other arrangements may utilize a sequence of two non-hole pressure sensors and one hole pressure sensor with subtractive combining means to derive the differential hole pressure. Alternatively, two hole pressure sensors and one non-hole pressure sensor may be arranged in sequence. Similar arrangements may be employed to measure the protuberance or negative-hole pressure differentials, by replacing the holes and hole pressure transducers with protuberances and protuberance pressure transducers.

35 Claims, 7 Drawing Figures

INVENTOR
Arthur Scott Lodge
by Burmeister, Palmatier
and Hamby Attys

MEASUREMENT OF HOLE PRESSURE DIFFERENTIALS AND PROTUBERANCE PRESSURE DIFFERENTIALS IN NON-NEWTONIAN LIQUIDS OR THE LIKE

This invention relates to the measurement of certain characteristics of liquids, particularly non-Newtonian liquids. In particular, the present invention provides a method and apparatus for measuring the hole pressure differential or error, or the protuberance pressure differential or error, in a flowing liquid.

The invention finds a particular and highly advantageous application to the measurement of the extent of polymerization in a resinous plastic liquid which is undergoing polymerization. The hole pressure differential increases as the polymerization progresses and is a sensitive indicator of the extent of polymerization. This is also true of the protuberance pressure differential.

It has been found that the hole pressure differs from the non-hole or flush wall pressure in a flowing non-Newtonian liquid. Similarly, the protuberance pressure differs from the flush wall pressure. In a Newtonian liquid, the pressure in the liquid is propagated equally in all directions. This property is not affected by the fact that the liquid is flowing. In a non-Newtonian liquid, on the other hand, the pressure is not propagated equally in all directions when the liquid is flowing. This gives rise to the hole pressure differential and the protuberance pressure differential.

It has been found that if a hole is provided in a wall along which a non-Newtonian liquid is flowing, the pressure at a point recessed within the hole is less than the non-hole pressure that would exist at the same position along the wall in the absence of the hole. This difference will be referred to as the hole pressure differential. Similarly, the pressure increase caused by a protuberance will be called the protuberance pressure differential. Under comparable rates of flow, hole pressure differentials are greater for non-Newtonian liquids than for Newtonian liquids.

In accordance with the present invention, the hole pressure differential is measured by providing at least one hole in a wall along which a non-Newtonian liquid is caused to flow under pressure. The wall may form a portion of a passage along which the fluid is caused to flow, or a portion of a reaction vessel or the like.

A hole pressure sensor is recessed into the hole to measure the hole pressure therein. At least one non-hole pressure sensor is mounted along the wall, either flush therewith or otherwise exposed to the liquid pressure. The measured pressures are combined or compared in such a way as to derive the hole pressure differential, either at the location of the hole or at some other predetermined location along the wall, such as the location of the non-hole pressure sensor.

In one arrangement, the non-hole pressure sensor is located opposite or in lateral alignment with the hole so that the measured non-hole pressure is the same as if it were measured at the location of the hole. The measured hole and non-hole pressures may then be combined subtractively to derive the hole pressure differential.

In another arrangement, two non-hole pressure sensors are located upstream and downstream at equal intervals from the hole. The measured non-hole pressures may then be averaged and combined subtractively with the hole pressure.

Similarly, two holes and hole pressure sensors may be located upstream and downstream at equal intervals from the non-hole pressure sensor. The average of the measured hole pressures can then be combined subtractively with the non-hole pressure.

It is also possible to employ two non-hole pressure sensors and one hole pressure sensor spaced at equal intervals. The hole pressure differential may be derived by utilizing successive subtracting devices connected to the sensors. In a similar arrangement, two hole pressure sensors and one non-hole pressure sensor may be spaced at equal intervals, with successive subtracting devices to derive the hole pressure differential.

The protuberance pressure differential may be measured by replacing the holes and hole pressure sensors with protuberances and protuberance pressure sensors. Generically, the holes and protuberances may be referred to as non-flush wall formations, which produce non-flush pressure differentials, relative to the flush wall pressures.

Further objects, advantages and features of the present invention will appear from the following description, taken with the accompanying drawings, in which.

Figure 6:
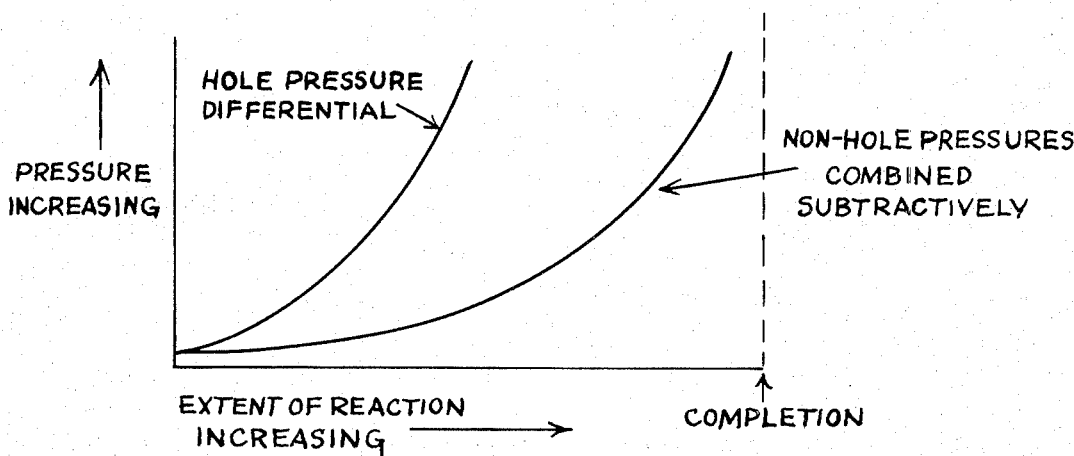

FIG. 6 comprises curves or graphs illustrating the advantages of measuring the hole pressure differential.

Figure 7:
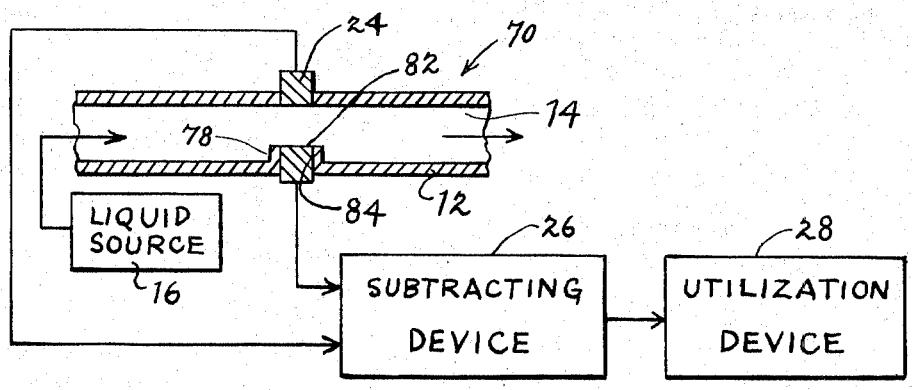

FIG. 7 is a diagrammatic view of a modified system for measuring the protuberance or negative hole pressure differential, rather than the hole pressure differential.

Figure 1:
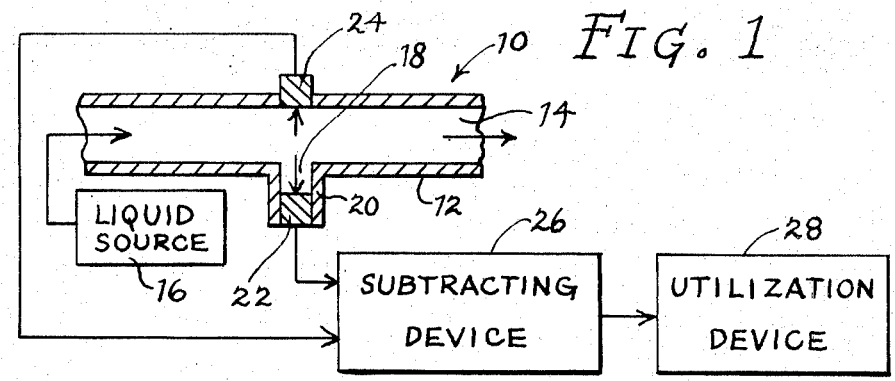
FIG. 1 is a diagrammatic view of an apparatus or system for measuring the hole pressure differential in a non-Newtonian liquid.

As just indicated, FIG. 1 illustrates a system or apparatus 10 comprising wall means 12 for confining the liquid which is to be the subject of the measurements. In this case, a passage 14 is formed by the wall means 12. However, the wall means 12 may form a portion of a vessel or receptacle, such as a reaction vessel, in which the liquid is being processed or retained.

The liquid is caused to flow or move along the wall means 12 by suitable means, illustrated as a liquid source 16, adapted to cause the liquid to flow along the passage 14. Such liquid source may comprise a pump or some other device to cause the liquid to flow along the wall means 12.

At least one hole or recess 18 is formed in the wall means 12. In this case, the hole 18 is formed by a laterally extending pipe or conduit 20 connected to the wall means 12. A pressure sensor 22 is recessed into the hole 18 to sense or measure the pressure in the hole. The hole pressure sensor 22 may take the form of a transducer or any other suitable pressure sensing device. The transducer may be of various suitable types, such as the variable capacitor type, in which the pressure changes the spacing between two capacitor electrodes, one of which is connected to a diaphragm or the like, exposed to the pressure. The changes in capacitance are employed to produce changes in electrical signals.

It has been found that when a non-Newtonian liquid is caused to flow along the wall means 12, the pressure in the hole 18 is less than the pressure in the liquid along the wall would be in the absence of the hole. This difference is called the hole pressure differential.

To measure the hole pressure differential, at least one non-hole pressure sensor 24 is mounted along the wall means 12 in such a manner as to avoid producing a hole. The apparatus 10 of FIG. 1 utilizes only one such non-hole pressure sensor disposed at a location where the non-hole pressure is the same as it would be at the location of the hole 18 in the absence of the hole. Thus, the non-hole pressure sensor 24 is illustrated as being located opposite the hole 18, or laterally alined therewith. The pressure sensor 24 is neither upstream nor downstream from the hole 18, but is at the same position relative to the liquid stream.

To avoid producing a hole, the pressure sensor 24 is preferably flush with the wall means 12, but the pressure sensor may in some cases be otherwise positioned so as to be exposed to the non-hole pressure in the liquid. As discussed in connection with the sensor 22, the non-hole pressure sensor 24 may comprise any suitable transducer or other device for indicating the pressure in the liquid.

In the apparatus 10 of FIG. 1, the hole pressure differential is derived by subtractively combining the outputs from the hole pressure sensor 22 and the non-hole pressure sensor 24. For this purpose, the outputs are supplied to a subtracting device 26, which subtracts one of the pressure signals or outputs from the other. The hole pressure may be subtracted from the non-hole pressure to give a hole pressure differential having a positive sign. If the non-hole pressure is subtracted from the hole pressure, the hole pressure differential will have a negative sign. It is advantageous to utilize pressure sensors in the form of transducers which have outputs in the form of electrical signals. The subtracting device 26 may then be of any known or suitable type used in electronic computation.

As shown in FIG. 1, a utilization device 28 is connected to the output of the subtracting device 26. Various devices may be employed as the utilization device 28. Thus, the utilization device may comprise a meter or some other indicator, a chart recorder, or an automatic control system, for example. The automatic control system may be employed to control the treatment or process to which the liquid is being subjected.

By way of specific example, the apparatus of FIG. 1 may be employed to monitor the hole pressure differential in a resinous plastic liquid which is in the process of a polymerization reaction. The hole pressure differential increases as the polymerization of the liquid progresses. Thus, the hole pressure differential may be employed to give a sensitive indication that the polymerization reaction has progressed to the desired extent. At this point, the pressure differential signal from the subtracting device 26 may be employed to actuate the utilization device 28, which they may perform control functions so as to terminte the polymerization reaction.

In the apparatus 10 of FIG. 1, the hole pressure sensor 22 and the non-hole pressure sensor 24 should be at the same level so as to avoid any difference in pressure due to gravity. It will be understood that the liquid may flow in either direction along the passage 14.

Figure 2:
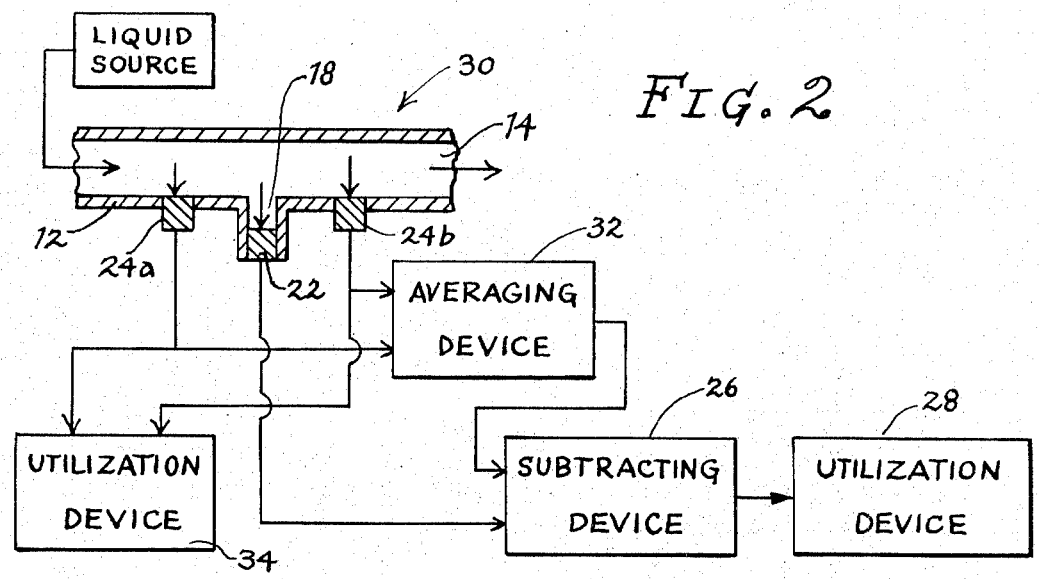
FIGS. 2-5 are diagrammatic views similar to FIG. 1, but showing several modified systems for measuring the hole pressure differential.

FIG. 2 illustrates a modified apparatus or system 30 for measuring hole pressure differentials. Many of the components shown in FIG. 2 are the same as shown in FIG. 1. To that extent, the components have been given the same reference characters so that repetition of descriptive details will not be necessary.

Instead of employing a single non-hole pressure sensor, the apparatus 30 of FIG. 2 utilizes two non-hole pressure sensors 24a and 24b spaced upstream and downstream from the hole 18. Preferably, the sensors 24a and 24b are equally spaced from the hole 18. With this arrangement, the average of the pressures at the sensors 24a and b corresponds to the non-hole pressure at the location of the hole 18. Consequently, it is preferred to connect the outputs of the non-hole pressure sensors 24a and b to an averaging device 32 which derives the average pressure. The average may then be combined subtractively with the hole pressure. For this purpose, the subtracting device 26 is connected to the non-hole pressure sensor 22 and the output of the averaging device 32.

The apparatus 30 of FIG. 2 has the advantage that all of the pressure sensors 22, 24a and 24b are mounted along the same portion of the wall means 12. In some cases, other portions of the wall means may not be readily accessible. Moreover, there is no need for locating the non-hole pressure sensor directly opposite from the hole pressure sensor, which may not be possible in some cases.

In some cases, it may advantageous to monitor or utilize the pressure drop between the two non-hole pressure sensors 24a and b. Such pressure drop may be employed, for example, as an indication of the rate at which the liquid is flowing along the passage 14. An indication of viscosity can also be obtained by comparing the pressure drop with the pressure at the first non-hole pressure sensor 24a.

Because of these additional measuring possibilities, the apparatus 30 of FIG. 2 is illustrated as comprising an additional utilization device 34, connected to the outputs of the non-hole pressure sensors 24a and b. The utilization device 34 may include computation devices for deriving the pressure drop and also the relationship of the pressure drop to the initial pressure. Moreover, the utilization device 34 may include meters or the like to indicate the rate of flow and the viscosity, as well as chart recorders, automatic control systems and the like.

Figure 3:
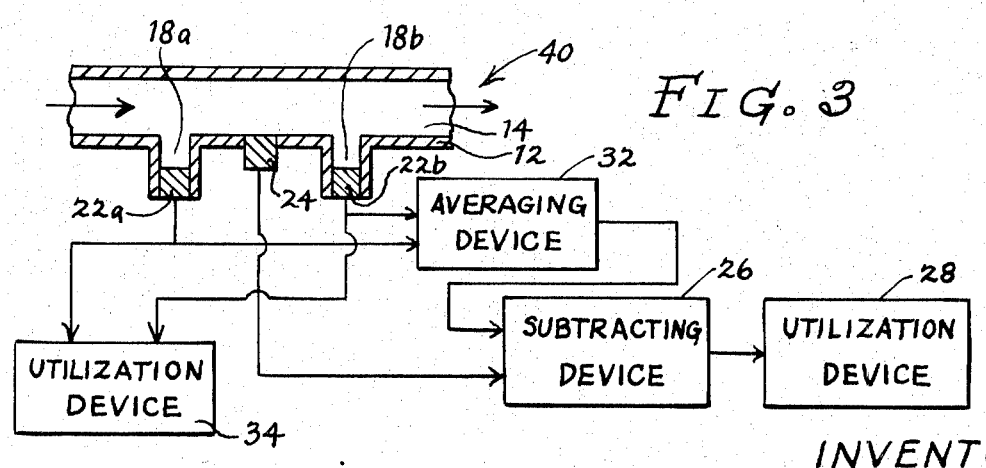

FIG. 3 illustrates another modified apparatus 40 utilizing two holes 18a and 18b in the wall means 12. Hole pressure sensors 22a and 22b are recessed into the holes 18a and b. The holes 18a and b are spaced upstream and downstream, preferably at equal intervals, from the single non-hole pressure sensor 24.

In this case, the average of the two measured hole pressures corresponds to the hole pressure which would be measured at the location of the non-hole pressure sensor 24. Consequently, the outputs of the hole pressure sensors 22a and b are connected to the averaging device 32. To derive the hole pressure differential, the subtracting device 26 is connected to the outputs of the non-hole pressure sensor 24 and the averaging device 32.

In FIG. 3, the additional utilization device 34 is connected to the outputs of the hole pressure sensors 22a and b, to utilize the pressure drop between the two sensors, in substantially the same manner as described in connection with FIG. 2.

Figure 4:
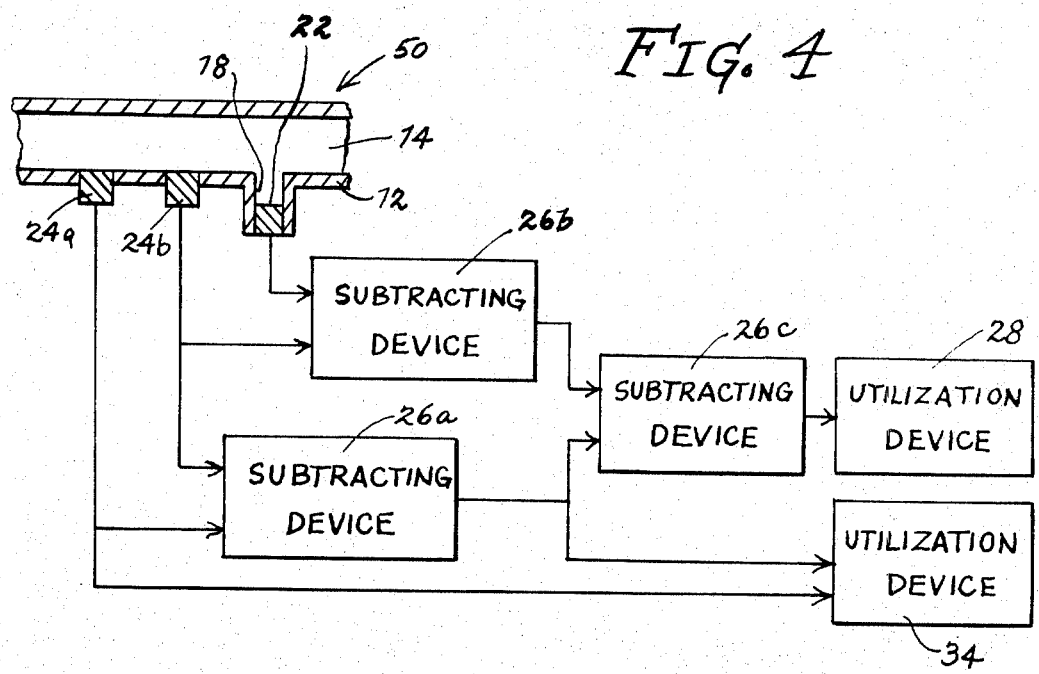

Another modified apparatus 50 is shown in FIG. 4. In this case, there are two non-hole pressure sensors 24a and b, but they are both on the same side of the hole pressure sensor 22. Thus, both of the non-hole pressure sensors 24a and b may be disposed either upstream or downstream from the hole pressure sensor 22. For simplicity of computation, the three pressure sensors 24a, 24b and 22 are preferably spaced at equal intervals along the liquid stream.

In the apparatus 50 of FIG. 4, the hole pressure differential may be derived by successive subtracting operations. For this purpose, a first subtracting device 26a is connected to the outputs of the non-hole pressure sensors 24a and b. The resulting difference corresponds to the pressure drop between these two pressure sensors. A second subtracting device 26b is connected to the outputs of the non-hole pressure sensor 24b and the hole pressure sensor 22 to derive the pressure drop therebetween. Such pressure drop would be the same as the pressure drop between the non-hole pressure sensors 24a and b, were it not for the differential hole pressure. Accordingly, the differential hole pressure may be derived by subtractively combining the two pressure drops. This is done by a third subtracting device 26c connected to the outputs of the subtracting devices 26a and b.

As before, the utilization device 28 is connected to the output of the subtracting device 26c. In this case, the second utilization device 34 is connected to the outputs of the non-hole pressure sensor 24a and the output of the first subtracting device 26a. The latter output gives the pressure drop, which may be employed as an indication of the rate of flow. An indication of viscosity may be obtained by comparing this pressure drop with the pressure at the non-hole pressure sensor 24a. It will be understood that the liquid may flow in either direction along the wall means 12.

Figure 5:
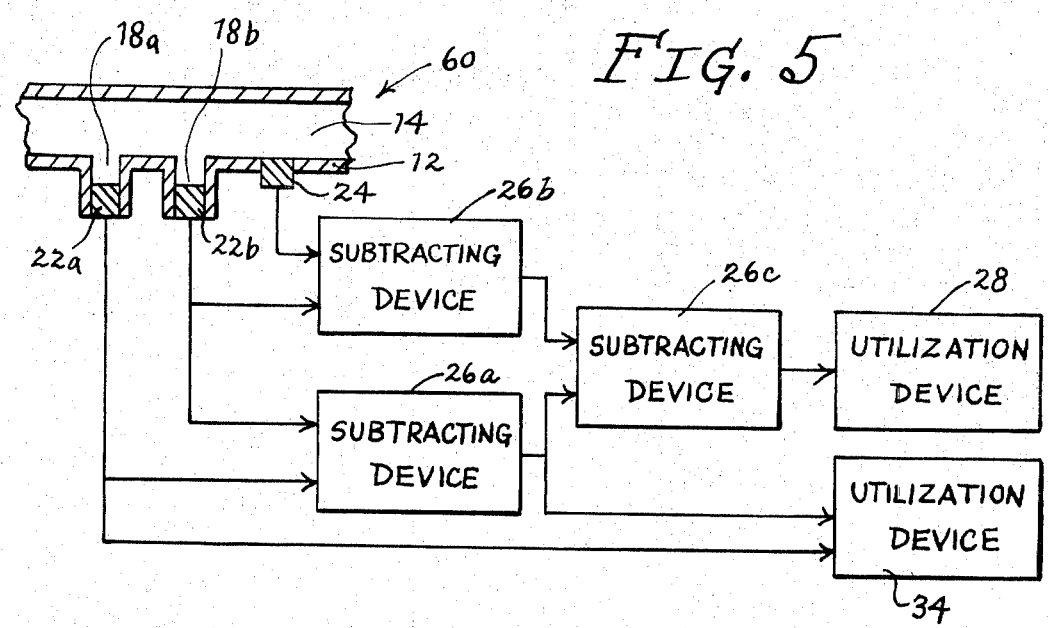

FIG. 5 illustrates still another measuring apparatus 60 which utilizes two holes 18a and 18b. Hole pressure sensors 22a and 22b are recessed into the holes 18a and b. Both holes 18a and b are shown as being on the same side of the non-hole pressure sensor 24. The hole pressure sensors 22a and b may be either upstream or downstream from the non-hole pressure sensor 24.

In this case, the first subtracting device 26a is connected to the outputs of the hole pressure sensors 22a and b, while the second subtracting device 26a is connected to the outputs of the hole pressure sensor 22b and the non-hole pressure sensor 24. Assuming equal spacing of the three sensors, the two pressure drops differ by an amount corresponding to the hole pressure differential at the sensor 22b. To derive the differential, the third subtracting device 26c is connected to the outputs of the first and second subtracting devices 26a and b.

In FIG. 5, the second utilization device is connected to the outputs of the first hole pressure sensor 22a and the first subtracting device 26a. As before, the pressure drop may be employed as an indication of the rate of flow. The pressure drop may be compared with the initial pressure to obtain an indication of viscosity.

It will be evident that the present invention provides convenient and versatile means for measuring the hole pressure differentials in non-Newtonian liquids. By utilizing electronic or other automatic computing devices, the hole pressure differential may be continuously monitored and employed to control the operation of automatic control systems.

As an illustration of the usefulness of measurements of the hole pressure differential in monitoring a polymerization reaction, the information conveyed by continuous measurement of the hole pressure differential during the course of a linear condensation polymerization reaction in a dilute solution flowing at constant rate is compared in FIG. 6 with the corresponding information conveyed by continuous measurement of the two non-hole pressures combined subtractively. The curves are drawn from theoretical estimates of performance and show that the hole pressure differential is the more sensitive indicator of the extent of the reaction.

When a liquid flows past a hole, the presence of the hole causes a change in the shape of the lines of flow, as compared with their shape if the hole were not present. The change of shape of the lines of flow, caused by a hole, coupled with the fact that in a flowing non-Newtonian liquid the pressure is not propagated equally in all directions, gives rise to the hole pressure differential. A change in the shape of the lines of flow can also be caused by a protuberance on the wall which will, therefore, act like a negative hole and give rise to a pressure differential when used with a flowing non-Newtonian liquid. This pressure differential may be measured by combining subtractively the pressure measured by a transducer suitably positioned at or near the apex of the protuberance and the pressure measured by a non-hole transducer or non-protuberance transducer. The pressure differential measured in this way with a negative hole or protuberance will serve the same useful functions as the hole pressure differential.

By way of example, FIG. 7 illustrates a system 70 for measuring the protuberance pressure differential. The system 70 is very similar to the system 10 illustrated in FIG. 1. However, a protuberance 78 is provided to replace the hole 18. The protuberance 78 projects into the passage 14 so as to modify the flow lines of the liquid as it travels along the passage. A protuberance pressure transducer 82 replaces the hole pressure transducer 22. It is preferred to mount the transducer 92 so that it measures the pressure at or near the end of the protuberance 78. As shown, the transducer 82 is fitted into an opening 84 in the protuberance 78 and is mounted substantially flush with the end of the protuberance 78.

In other respects, the system 70 of FIG. 7 is the same as the system 10 of FIG. 1. The pressure sensed by the protuberance transducer 82 is compared with the pressure sensed by the non-protuberance transducer 24. As before, the transducer 24 is preferably flush with the wall of the passage 14, opposite the protuberance transducer 82. The pressure signals from the transducers 24 and 82 may be combined subtractively by the subtracting device 26 so as to obtain a difference signal representing the protuberance pressure differential.

The protuberance pressure differential may be utilized in the same manner as the hole pressure differential as discussed previously. If desired, the protuberance transducer 82 may itself constitute the protuberance.

Any of the previously discussed systems for measuring the hole pressure differential may be modified to measure the protuberance or negative hole pressure differential. Thus, the systems of FIGS. 2, 3 and 4 may be modified by replacing the holes with protuberances. The hole pressure transducers are then replaced or relocated to provide protuberance pressure transducers.

Various other modifications, alternative constructions and equivalents may be employed, as will be evident to those skilled in the art.

I claim:
1. Apparatus for measuring the non-flush pressure differential in a liquid,
comprising wall means,
means for causing the liquid to flow along said wall means,
non-flush pressure sensing means including at least one non-flush formation along said wall means and at least one non-flush pressure sensor connected with said formation,
said non-flush formation being localized and thereby being operative to change the shape of the flow lines in said liquid adjacent said non-flush pressure sensor without substantial changing the speed of the flow,
flush pressure sensing means including at least one flush pressure sensor exposed to the liquid along said wall means,
and means connected to said last two mentioned means for deriving the difference between the flush pressure and the non-flush pressure at a predetermined location along said wall means.

2. Apparatus for measuring the non-flush pressure differential in a liquid,
comprising wall means,
means for causing the liquid to flow along said wall means,
non-flush pressure sensing means including at least one non-flush formation along said wall means and at least one non-flush pressure sensor connected with said formation,
said non-flush formation being localized and thereby being operative to change the shape of the flow lines in said liquid adjacent said non-flush pressure sensor,
flush pressure sensing means including at least one flush pressure sensor exposed to the liquid along said wall means,
and means connected to said last two mentioned means for deriving the difference between the flush pressure and the non-flush pressure at a predetermined location along said wall means,
said flush pressure sensor being located in a position where the flush pressure is the same as the flush pressure would be at the location of said non-flush formation in the absence of said non-flush formation.

3. Apparatus for measruing the non-flush pressure differential in a liquid,
comprising wall means,
means for causing the liquid to flow along said wall means,
non-flush pressure sensing means including at least one non-flush formation along said wall means and at least one non-flush pressure sensor connected with said formation,
said non-flush formation being localized and thereby being operative to change the shape of the flow lines in said liquid adjacent said non-flush pressure sensor,
flush pressure sensing means including at least one flush pressure sensor exposed to the liquid along said wall means,
and means connected to said last two mentioned means for deriving the difference between the flush pressure and the non-flush pressure at a predetermined location along said wall means,
said flush pressure sensing means including two flush pressure sensors spaced upstream and downstream from said formation.

4. Apparatus according to claim 3,
including means for averaging the flush presures,
and means for subtractively combining said non-flush pressure with the average of said flush pressures.

5. Apparatus for measuring the non-flush pressure differentials in a liquid,
comprising wall means,
means for causing the liquid to flow along said wall means,
non-flush pressure sensing means including at least one non-flush formation along said wall means and at least one non-flush pressure sensor connected with said formation,
said non-flush formation being localized and thereby being operative to change the shape of the flow lines in said liquid adjacent said non-flush pressure sensor,
flush pressure sensing means including at least one flush pressure sensor exposed to the liquid along said wall means,
and means connected to said last two mentioned means for deriving the difference between the flush pressure and the non-flush pressure at a predetermined location along said wall means,
said non-flush pressure sensing means including two non-flush formations along said wall means and two non-flush pressure sensors connected with said formations.

6. Apparatus for measuring the non-flush pressure differential in a liquid,
comprising wall means,
means for causing the liquid to flow along said wall means,
non-flush pressure sensing means including at least one non-flush formation along said wall means and at least one non-flush pressure sensor connected with said formation,
said non-flush formation being localized and thereby being operative to change the shape of the flow lines in said liquid adjacent said non-flush pressure sensors,
flush pressure sensing means including at least one flush pressure sensor exposed to the liquid along said wall means,
and means connected to said last two mentioned means for deriving the difference between the flush pressure and the non-flush pressure at a predetermined location along said wall means,
said flush pressure sensing means including two flush pressure sensors located differently relative to said non-flush pressure sensor.

7. Apparatus for measuring the non-flush pressure differential in a liquid,
comprising wall means,
means for causing the liquid to flow along said wall means,
non-flush pressure sensing means including at least one non-flush formation along said wall means and at least one non-flush pressure sensor connected with said formation,
said non-flush formation being localized and thereby being operative to change the shape of the flow lines in said liquid adjacent said non-flush pressure sensor, flush pressure sensing means including at least one flush pressure sensor exposed to the liquid along said wall means, and means connected to said two mentioned means for deriving the difference between the flush pressure and the non-flush pressure at a predetermined location along said wall means, said non-flush formation comprising a hole extending into said wall means.

8. Apparatus for measuring the non-flush pressure differential in a liquid, comprising wall means, means for causing the liquid to flow along said wall means, non-flush pressure sensing means including at least one non-flush formation along said wall means and at least one non-flush pressure sensor connected with said formation, said non-flush formation being of a minor localized character and thereby being operative to change the shape of the flow lines in said liquid adjacent said non-flush pressure sensor without substantially changing the speed of the liquid flow so that the speed of the liquid flow past said non-flush formation is substantially the same as the speed of the liquid flow past said flush pressure sensor, flush pressure sensing means including at least one flush pressure sensor exposed to the liquid along said wall means, and means connected to said last two mentioned means for deriving the difference between the flush pressure and the non-flush pressure at a predetermined location along said wall means.

9. A method of measuring certain characteristics of a non-Newtonian elastic liquid, comprising the steps of providing wall means having at least one non-flush formation therealong, causing the non-Newtonian elastic liquid to flow along said wall means and past said formation, sensing the non-flush pressure in said liquid at a point under the influence of said non-flush formation, said non-flush formation being localized and thereby being operative to change the shape of the flow lines in the liquid adjacent said non-flush formation, sensing the flush pressure in at least one location in said liquid and adjacent said wall means, and combining said flush pressure and said non-flush pressure to derive the difference between the flush pressure and the non-flush pressure at a predetermined location along said wall means.

10. A method of measuring certain characteristics of a non-Newtonian elastic liquid, comprising the steps of providing wall means having at least one non-flush formation therealong, causing the non-Newtonian elastic liquid to flow along said wall means and past said formation.

sensing the non-flush pressure in said liquid at a point under the influence of said non-flush formation, said non-flush formation being locallized and thereby being operative to change the shape of the flow lines in the liquid adjacent said non-flush formation, sensing the flush pressure in at least one location in said liquid and adjacent said wall means, and combining said flush pressure and said non-flush pressure to derive the difference between the flush pressure and the non-flush pressure at a predetermined location along said wall means, said sensing of said flush pressure being done at a location where the flush pressure is the same as the flush pressure would be at the location of said non-flush formation in the absence of said non-flush formation, said flush pressure and said non-flush pressure being combined subtractively.

11. A method of measuring certain characteristics of a non-Newtonian elastic liquid, comprising the steps of providing wall means having at least one non-flush formation therealong, causing the non-Newtonian elastic liquid to flow along said wall means and past said formation, sensing the non-flush pressure in said liquid at a point under the influence of said non-flush formation, said non-flush formation being localized and thereby being operative to change the shape of the flow lines in the liquid adjacent said non-flush formation, sensing the flush pressure in at least one location in said liquid and adjacent said wall means, and combining said flush pressure and said non-flush pressure to derive the difference between the flush pressure and the non-flush pressure at a predetermined location along said wall means, two non-flush formations being provided along said wall means, the non-flush pressure being sensed at two points under the influence of the two non-flush formations.

12. A method of measuring certain characteristics of a non-Newtonian elastic liquid, comprising the steps of providing wall means having at least one non-flush formation therealong, causing the non-Newtonian elastic liquid to flow along said wall means and past said formation, sensing the non-flush pressure in said liquid at a point under the influence of said non-flush formation, said non-flush formation being localized and thereby being operative to change the shape of the flow lines in the liquid adjacent said non-flush formation, sensing the flush pressure in at least one location in said liquid and adjacent said wall means, and combining said flush pressure and said non-flush pressure to derive the difference between the flush pressure and the non-flush pressure at a predetermined location along said wall means, the flush pressure being sensed at two different locations along said wll means.

13. A method of measuring certain characteristics of a non-Newtonian elastic liquid, comprising the steps of providing wall means having at least one non-flush formation therealong, causing the non-Newtonian elastic liquid to flow along said wall means and past said formation, sensing the non-flush pressure in said liquid at a point under the influence of said non-flush formation, said non-flush formation being localized and thereby being operative to change the shape of the flow lines in the liquid adjacent said non-flush formation, sensing the flush pressure in at least one loation in said liquid and adjacent said wall means, maintaining the speed of liquid flow substantially the same past said non-flush formation as along said wall means where said flush pressure is sensed, and combining said flush pressure and said non-flush pressure to derive the difference between the flush pressure and the non-flush pressure at a predetermined location along said wall means, the non-flush formation comprising a localized hole extending into said wall means.

14. A method of measuring certain characteristics of a non-Newtonian elastic liquid, comprising the steps of providing wall means having at least one non-flush formation therealong, causing the non-Newtonian elastic liquid to flow along said wall means and past said formation, sensing the non-flush pressure in said liquid at a point under the influence of said non-flush formation, said non-flush formation being localized and thereby being operative to change the shape of the flow lines in the liquid adjacent said non-flush formation, sensing the flush pressure in at least one location in said liquid and adjacent said wall means, maintaining the speed of liquid flow substantially the same past said non-flush formation as along said wall means where said flush pressure is sensed, and combining said flush pressure and said non-flush pressure to derive the difference between the flush pressure and the non-flush pressure at a predetermined location along said wall means, said non-flush formation comprising a localized protuberance extending from said wall means.

15. Apparatus for measuring the hole pressure differential in a liquid, comprising wall means, means for causing the liquid to flow along said wall means, hole pressure sensing means including at least one hole in said wall means and at least one hole pressure sensor recessed into said hole for sensing the hole pressure therein, non-hole pressure sensing means including at least one non-hole pressure sensor exposed to the liquid along said wall means, and means connected to said last two mentioned means for deriving the difference between the non-hole pressure and the hole pressure at a predetermined location along said wall means.

16. Apparatus according to claim 15, in which said non-hole pressure sensor is located in a position where the non-hole pressure is the same as the non-hole pressure would be at the location of said hole in the absence of said hole.

17. Apparatus according to claim 16, including means for subtractively combining said hole pressure and said first-mentioned non-hole pressure to derive the differential hole pressure.

18. Apparatus according to claim 15, in which said non-hole pressure sensing means includes non-hole pressure sensors disposed upstream and downstream from said hole.

19. Apparatus according to claim 18, including means for averaging the non-hole pressures, and means for subtractively combing said hole pressure with the average of said non-hole pressures.

20. Apparatus according to claim 15, in which said hole pressure sensing means includes two holes in said wall means and two hole pressure sensors in said holes, said holes being spaced on opposite sides of said non-hole pressure sensor.

21. Apparatus according to claim 20, including means for averaging the two hole pressures and combining said non-hole pressure subtractively with the average of the hole pressures.

22. Apparatus according to claim 15, in which said non-hole pressure sensing means includes two non-hole pressure sensors located differently relative to said hole pressure sensor.

23. Apparatus according to claim 24, including means for subtractively combining the two non-hole pressures and the hole pressure.

24. Apparatus according to claim 15, in which said hole pressure sensing means includes two holes in said wall means and located differently relative to said non-hole pressure sensor, said holes being provided with two hole pressure sensors, said apparatus including means for subtractively combining the two hole pressures and the non-hole pressure.

25. A method of measuring certain characteristics of a liquid, comprising the steps of providing wall means having at least one hole therein, causing the liquid to flow along said wall means and past said hole, sensing the hole pressure in said liquid at a point recessed into said hole, sensing the non-hole pressure in at least one location in said liquid and adjacent said wall means, and combining said non-hole pressure and said hole pressure to derive the difference between the non-hole pressure and the hole pressure at a predetermined location along said wall means.

26. A method according to claim 25, in which said sensing of said non-hole pressure takes place at a location where the non-hole pressure is the same as the non-hole pressure would be at the location of said hole in the absence of said hole, said first-mentioned non-hole pressure and said hole pressure being combined subtractively.

27. A method according to claim 25, in which the sensing of said non-hole pressure is performed at two locations spaced upstream and downstream from said hole.

28. A method according to claim 27, in which the non-hole pressures are averaged and combined subtractively with said hole pressure.

29. A method according to claim 25, in which two spaced holes are provided in said wall means, the non-hole pressure being sensed at a location between said holes, the hole pressure being sensed in both of said holes.

30. A method according to claim 29, in which the hole pressures sensed in said holes are averaged and combined subtractively with the non-hole pressue.

31. A method according to claim 25, in which the non-hole pressure is sensed at two points located differently relative to said hole, the non-hole pressures being combined arithmeti-

32. A method according to claim 25,
in which two holes are provided in said wall means,
the hole pressure being sensed in both of said holes,
the non-hole pressure being sensed at a location located differently relative to said holes,
the hole pressures and the non-hole pressure being combined arithmetically.

33. Apparatus for measuring the protuberance pressure differential in a non-Newtonian elastic liquid, comprising wall means,
means for causing the non-Newtonian elastic liquid to flow along said wall means,
protuberance pressure sensing means including at least one protuberance on said wall means and at least one protuberance pressure sensor disposed at a point under the influence of said protuberance,
non-protuberance pressure sensing means including at least one non-protuberance pressure sensor exposed to the liquid along said wall means,
said protuberance being of a minor localized character and thereby being operative to change the shape of the flow lines in said liquid without substantially changing the speed of the liquid flow adjacent said protuberance pressure sensor so that the speed of the liquid flow past said protuberance is substantially the same as the speed of the liquid flow past said non-protuberance pressure sensor,
and means connected to said last two mentioned means for deriving the difference between the non-protuberance pressure and the protuberance pressure at a predetermined location along said wall means.

34. Apparatus for measuring the protuberance pressure differential in a non-Newtonian elastic liquid, comprising wall means,
means for causing the non-Newtonian elastic liquid to flow along said wall means,
protuberance pressure sensing means including at least one protuberance on said wall means and at least one protuberance pressure sensor disposed at a point under the influence of said protuberance,
said protuberance being localized and thereby being operative to change the shape of the flow lines in said liquid adjacent said protuberance pressure sensor,
non-protuberance pressure sensing means including at least one non-protuberance pressure sensor exposed to the liquid along said wall means,
and means connected to said last two mentioned means for deriving the difference between the non-protuberance pressure and the protuberance pressure at a predetermined location along said wall means,
said non-protuberance pressure sensor being located in a position where the non-protuberance pressure is the same as the non-protuberance pressure would be at the location of said protuberance in the absence of said protuberance.

35. Apparatus according to claim 34, including means for subtractively combining said protuberance pressure and said first-mentioned non-protuberance pressure to derive the differential protuberance pressure.

* * * * *

UNITED STATES PATENT OFFICE
CERTIFICATE OF CORRECTION

Patent No. 3,777,549    Dated June 26, 1974

Inventor(s) Arthur Scott Lodge

It is certified that error appears in the above-identified patent and that said Letters Patent are hereby corrected as shown below:

Column 3, line 55, after "which", --they-- should be deleted.

Column 4, line 24, after "may", insert --be--.

Column 5, line 42, after "device", change "26a" to --26b--.

Column 7, line 19, after "mentioned" insert --sensing--.
Column 7, line 39, after "mentioned" insert --sensing--.
Column 7, line 64, after "mentioned" insert --sensing--.

Column 8, line 5, after "flush", change "presures" to --pressures--
Column 8, line 24, after "mentioned" insert --sensing--.
Column 8, line 48, after "mentioned" insert --sensing--.

Column 9, line 4, after "mentioned" insert --sensing--.
Column 9, line 30, after "mentioned" insert --sensing--.
Column 9, line 60, after "being", change "locallized" to
    --localized--.

Column 11, line 11, after "non-Newtonian", change "ealstic" to
    --elastic--.
Column 11, line 45, after "mentioned" insert --sensing--.
Column 11, line 65, after "subtractively", change "combing" to
    --combining--.

Column 12, line 14, after "claim", change "24" to --22--.
Column 12, line 63, after "hole", change "pressue" to
    --pressure--.

Column 13, line 29, after "mentioned" insert --sensing--.

Column 14, line 17, after "mentioned" insert --sensing--.

Signed and sealed this 5th day of November 1974.

(SEAL)
Attest:

McCOY M. GIBSON JR.                C. MARSHALL DANN
Attesting Officer                  Commissioner of patents